United States Patent [19]

Saito et al.

[11] Patent Number: 4,780,736
[45] Date of Patent: Oct. 25, 1988

[54] METHOD OF AND APPARATUS FOR RECORDING IMAGE

[75] Inventors: Minoru Saito; Takatoshi Otsu; Sumio Yoshikawa, all of Kanagawa, Japan

[73] Assignee: Fuji Photo Film Co., Ltd., Kanagawa, Japan

[21] Appl. No.: 890,582

[22] Filed: Jul. 30, 1986

[30] Foreign Application Priority Data

| Jul. 30, 1985 | [JP] | Japan | 60-116734[U] |
| Jul. 30, 1985 | [JP] | Japan | 60-116737[U] |
| Jul. 30, 1985 | [JP] | Japan | 60-116739[U] |
| Jul. 30, 1985 | [JP] | Japan | 60-168411 |
| Jul. 30, 1985 | [JP] | Japan | 60-168412 |
| Oct. 18, 1985 | [JP] | Japan | 60-233065 |

[51] Int. Cl.$^4$ .......... G03D 9/00; G03D 5/06; G03C 5/00
[52] U.S. Cl. .......... 354/303; 354/305; 354/317; 430/203; 430/403; 250/319
[58] Field of Search .......... 354/301, 303, 305, 317, 354/318; 430/203, 403; 346/76 R, 76 PH, 137.1; 250/317.1, 318, 319

[56] References Cited

U.S. PATENT DOCUMENTS

| 3,827,906 | 8/1974 | Sato et al. | 354/317 |
| 4,013,360 | 3/1977 | Burke et al. | 354/301 |
| 4,620,096 | 10/1986 | Takehara et al. | 250/319 |
| 4,629,675 | 12/1986 | Takehara et al. | 430/203 |

FOREIGN PATENT DOCUMENTS 59-75247  4/1984  Japan .

Primary Examiner—A. A. Mathews
Attorney, Agent, or Firm—Sughrue, Mion, Zinn, Macpeak, and Seas

[57] ABSTRACT

An image recording method wherein an image recorded on a thermal developing photosensitive material is transferred to an image-receiving material in the presence of an image forming solvent so as to be formed on the image-receiving material. A water absorbent applicator member which retains the image forming solvent is allowed to come in and out of contact with the surface of either the thermal developing photosensitive material or the image-receiving material, which are moving. Also disclosed is an apparatus suitably employed to carry out the above-described image recording method. The apparatus has driving means for activating the water absorbent applicator member retaining the image forming solvent to move between an application position at which the applicator member applies the image forming solvent to the surface of either the thermal developing photosensitive material or the image-receiving material, which are moving, and a retraction position which is spaced apart from the application position. Thus, the amount of application of the image forming solvent is appropriately controlled.

39 Claims, 13 Drawing Sheets

(A)

(B)

METHOD OF AND APPARATUS FOR RECORDING IMAGE

BACKGROUND OF THE INVENTION

1. Field of the Invention

The present invention relates to a method of and apparatus for recording an image. More particularly, the present invention pertains to an image recording method wherein an image recorded on a thermal developing photosensitive material is transferred to an image-receiving material in the presence of an image forming solvent, thereby recording the image on the image-receiving material. The present invention is also concerned with an apparatus suitably employed to carry out the above-described method.

2. Description of the Related Art

One type of image recording apparatus employs a thermal developing photosensitive material to obtain a color image. One example of this type of apparatus is shown in the specification Japanese Patent Laid-Open No. 75247/1984. In this known apparatus, an image is formed on a thermal developing photosensitive material by light exposure in an exposing section. The photosensitive material is then transported to a thermal developing section to effect thermal development. Then, an image-receiving paper is brought into close contact with the thermally developed photosensitive material, and the developed image is transferred to the image-receiving paper by a transfer process.

Before being transported to the transfer section, the image-receiving paper is given a transfer assistant (i.e., an image forming solvent) such as water for the purpose of improving the transfer efficiency.

For this purpose, in the apparatus disclosed in the above-described specification of Japanese Patent Laid-Open No. 75247/1984, water is applied to the image-receiving paper by means of a roller soaked with water. With this arrangement, however, the application of water is apt to lack in uniformity, and this leads to uneven transfer, disadvantageously.

There has heretofore been proposed another prior art apparatus wherein, before being transported to the transfer section, the image-receiving paper is passed through a water tank so as to be coated with water. This apparatus suffers, however, from the following problems. When the image-receiving paper is passed through the water tank, water is also applied to the reverse surface of the paper, which means that the image-receiving paper may curl, and the quantity of heat required during heat transfer is increased. In addition, since water is applied all over the image-receiving paper, when the paper is brought into close contact with the photosensitive material for effecting transfer, surplus water is squeezed to overflow together with the emulsion coated on the image-carrying portion, thus causing a feed roller, a developing roller and the like to become stained.

SUMMARY OF THE INVENTION

In view of the above-described circumstances, it is a primary object of the present invention to provide an image recording method which enables the amount of application of an image forming solvent such as water to be controlled appropriately and which permits an image forming solvent to be applied to only a necessary portion of a thermal developing photosensitive material or an image-receiving material, together with an apparatus which may be suitably employed to carry out the above-described method.

To this end, the present invention provides an image recording method wherein an image recorded on a thermal developing photosensitive material is transferred to an image-receiving material in the presence of an image forming solvent so as to be formed on the image-receiving material, characterized in that the image forming solvent is applied to the surface of either the photosensitive material or the image-receiving material in such a manner that a water absorbent applicator member which retains the image forming solvent is allowed to come in and out of contact with said surface.

The present invention also provides a image recording apparatus wherein an image recorded on a thermal developing photosensitive material is transferred to an image-receiving material in the presence of an image forming solvent, the apparatus comprising: a tank containing the image forming solvent; a water absorbent applicator member having one end thereof inserted into the tank and the other end thereof projecting outward from the tank to define an applicator portion for applying the image forming solvent; and driving means for activating the applicator member to move between an application position for applying the image forming solvent to the surface of either the thermal developing photosensitive material or the image-receiving material and a retraction position which is spaced apart from the application position.

Thus, it is possible, according to the present invention, to appropriately control the amount of the image forming solvent applied by the applicator member and also apply the image forming solvent to any desired position on the photosensitive material or the image-receiving material in the direction in which it is transported by allowing the applicator member to come in and out of the surface of either the photosensitive material or the image-receiving material.

It should be noted that the image recording method according to the present invention may be such that a thermal developing photosensitive material having an image formed thereon by light exposure is subjected to thermal development, and this thermally developed photosensitive material and the image-receiving material are then laid one upon the other and heated to transfer the image formed on the photosensitive material to the image-receiving material, or the method may be such that a thermal developing photosensitive material having an image formed thereon by light exposure and an image-receiving material are laid one upon the other and heated to effect thermal development and heat transfer at the same time, thereby forming the transferred image on the image-receiving material.

The image recording apparatus according to the present invention may have a thermal developing section and a transfer section which are provided separately from each other, the thermal developing section being adapted to develop thermally a thermal developing photosensitive material having an image formed thereon by light exposure, and the transfer section being adapted such that the thermally developed photosensitive material and an image-receiving material are laid one upon the other and heated to transfer the image formed on the photosensitive material to the image-receiving material. Alternatively, the thermal developing section and the transfer section may be provided at the same position, that is, the image recording apparatus may be provided with a thermal developing/transfer section in which a thermal developing photosensitive material having been subjected to light exposure and an image-receiving material are laid one upon the other and heated to effect thermal development and heat transfer at the same time.

It should be noted that the applicator member having water absorption properties is only required to be made of a water absorbent material which is able to retain an image forming solvent such as water even in a small amount, and it is possible to employ, for example, porous materials such as sponge and expanded material, felt material, and hairy material.

The image forming solvent employed in the present invention is a solvent which is necessary for forming an image. Examples include water, low-boiling point organic solvents (alcohol, ketones, amides, etc.), and mixtures obtained by adding various adders such as a surface-active agent, a development accelerator and a development stopper to the above-described solvents.

DESCRIPTION OF THE PREFERRED EMBODIMENTS

The method of and apparatus for recording an image according to the present invention will be described hereinunder by way of an example in which thermal development and heat transfer are effected simultaneously.

Figure 1:
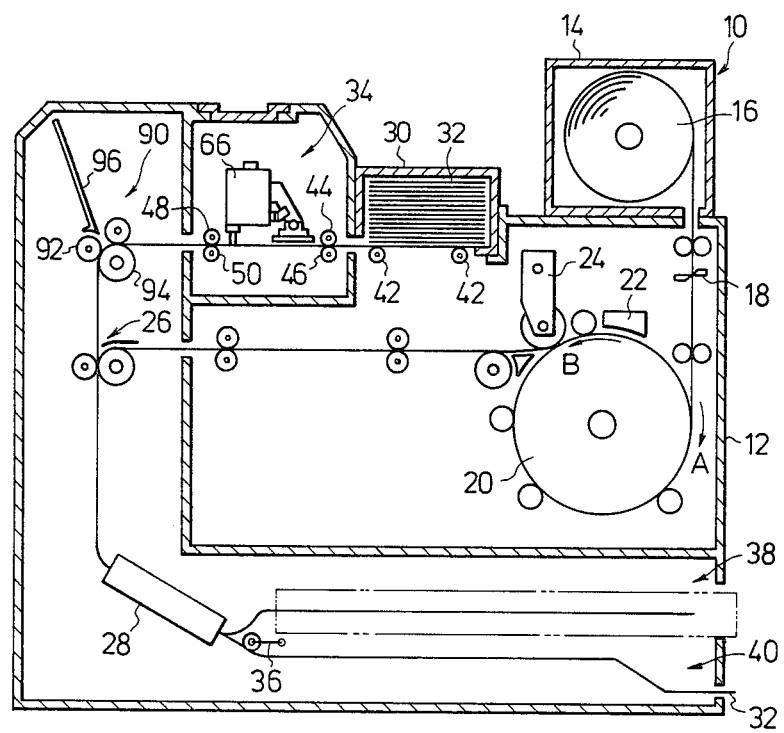
FIG. 1 is a sectional view of a first embodiment of the image recording apparatus according to the present invention.

FIG. 1 shows an image recording apparatus 10 in accordance with a first embodiment of the present invention.

In this image recording apparatus 10, a magazine 14 accommodating a thermal developing photosensitive material 16 is mounted on a machine frame 12. The photosensitive material 16 which is unwound from the magazine 14 is cut into a necessary length by a cutter 18 and transported in the direction of the arrow A so as to be wound around the outer periphery of an exposing drum 20 installed inside the machine frame 12. The photosensitive material 16 is then subjected to light exposure by an exposing head 22, and transported in the opposite direction (the direction of the arrow B) so as to be separated from the outer periphery of the exposing drum 20 by a scraper 24 and sent to an overlaying section 26.

Image-receiving sheets of paper 32 are accommodated in layers within a cassette 30 and supplied one by one through a water applicator section 34. The image-receiving sheet 32 is laid on the photosensitive material 16 at the overlaying section 26 and transported to a thermal developing/transfer section 28. A separating section 36 is provided on the downstream side of the section 28. On the downstream side of the separating section 36, the photosensitive material 16 is transported to an accommodating means 38, and the image-receiving paper 32 is sent to a delivery section 40.

The image-receiving sheets of paper 32 which are accommodated in the cassette 30 are subjected to driving force applied from feed rollers 42 rotatably supported by the machine frame 12, so that the lowermost sheet is delivered to the water applicator section 34.

The water applicator section 34 will be explained below in detail with reference to FIGS. 2 to 4.

In the water applicator section 34, a pair of feed rollers 44, 46 adapted to feed the image-receiving paper 32 held therebetween are disposed in close proximity with the cassette 30. A pair of feed rollers 48, 50 are disposed on the downstream side of these feed rollers 44, 46 in such a manner that they feed the image-receiving paper 32 held therebetween. These rollers are rotated by the driving force derived from a motor (not shown) so as to transport the image-receiving paper 32 toward the overlaying section 26. Between these pairs of feed rollers, a guide plate 51 is provided in opposing relation to the reverse side (the side opposite to the emulsion-coated side) of the image-receiving paper 32 being transported.

Figure 4:
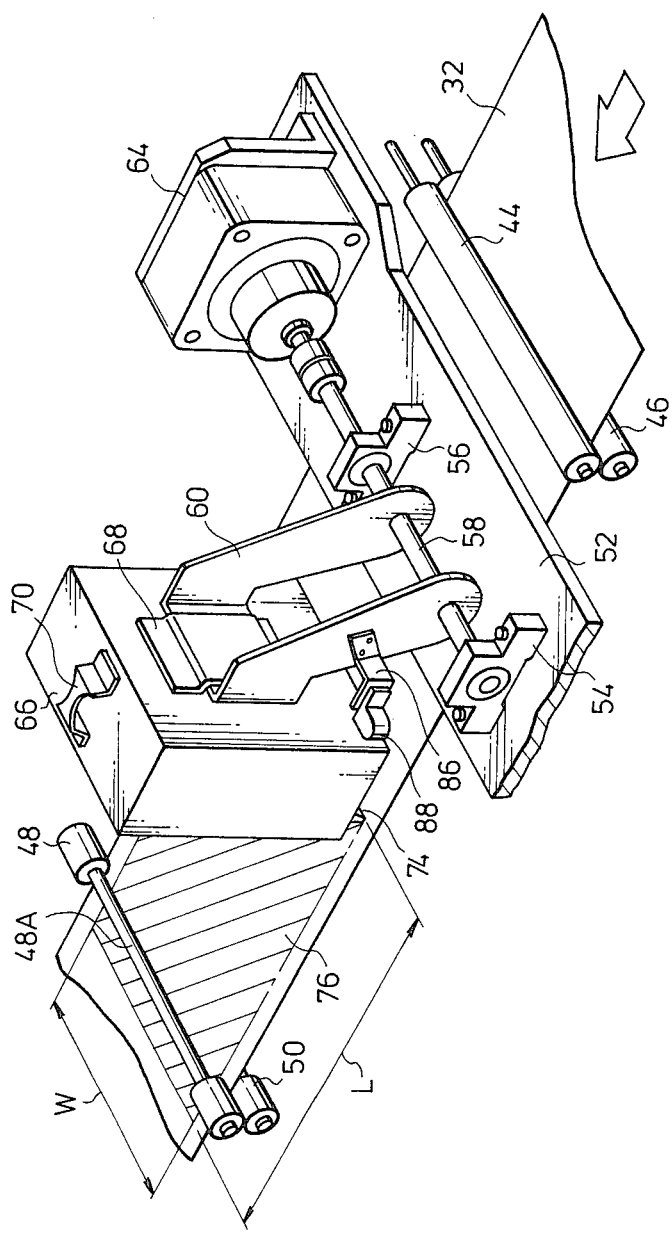
FIG. 4 is a perspective view showing the water applicator section according to the first embodiment in the application position.

As also shown in FIG. 4, a bracket 52 is stretched between the feed rollers 44 and 48 in such a manner that the bracket 52 is positioned in close proximity with the image transfer surface, that is, the emulsion-coated side, of the transported image-receiving paper 32. A rotary shaft 58 is rotatably supported on the bracket 52 through a pair of bearings 54, 56. A pivoting arm 60 is rigidly secured to the rotary shaft 58. The pivoting arm 60 is formed from a plate material in such a manner that two end portions of the plate material are bent at right angle so as to extend parallel with each other, the arm 60 being rigidly secured at these extended portions to the rotary shaft 58.

Figure 2:
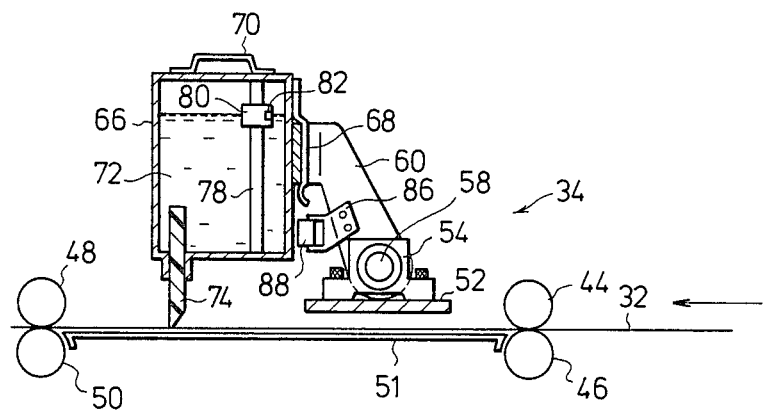
FIG. 2 is an enlarged sectional view showing the water applicator section according to the first embodiment in the application position.
Figure 3:
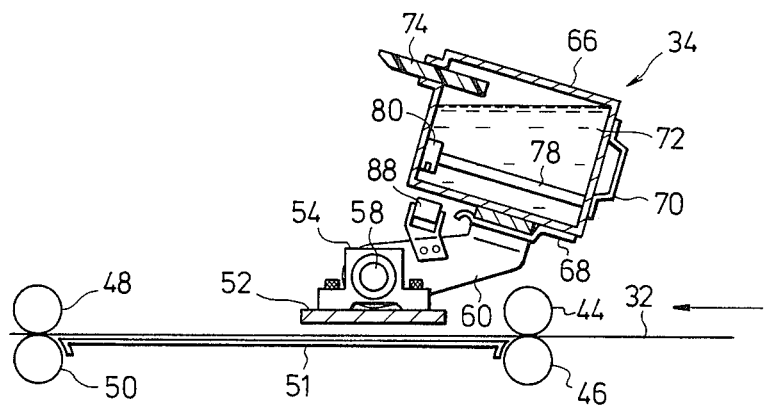
FIG. 3 shows the water applicator section according to the first embodiment in the retraction position.

One end portion of the rotary shaft 58 which projects from the bearing 56 is connected to a motor 64 through a coupling 62, so that the shaft 58 which is subjected to the rotational force from the motor 64 can make the arm 60 pivot between the position shown in FIG. 2 and the position shown FIG. 3.

A clip 68 is rigidly secured at one end thereof to one side wall of a tank 66 and fitted on the central portion of the pivoting arm 60, whereby the tank 66 is mounted on the arm 60. A handle 70 is provided on the top of the tank 66. When an operator holds this handle 70 and raises it upwardly from the position shown in FIG. 2 or 4, the clip 68 comes off the pivoting arm 60, thereby allowing the tank 66 to be removed. For this purpose, the clip 68 is preferably made of a leaf spring material.

As shown in FIG. 2, the tank 66 contains water 72 which serves as an image forming solvent. The water 72 is applied to the surface of the image-receiving paper 32 through a porous felt member 74. More specifically, one end of the felt member 74 is inserted into the tank 66, while the distal end portion, that is, an applicator portion, of the felt member 74 which projects from the tank 66 is brought into contact with the surface of the image-receiving paper 32 as shown in FIGS. 2 and 4, and in this state, the felt member 74 can apply the water impregnated therein to the central portion of the surface of the image-receiving paper 32 (this position will hereinafter be referred to as the "application position"). In the state shown in FIG. 3, since the felt material 74 is separated from the image-receiving paper 32, no application of water is effected (this position will hereinafter be referred to as the "retraction position"), and the inner end of the felt member 74 is separated from the water 72 contained in the tank 66.

It should be noted that, to enable the tank 66 to be accurately stopped at the application position shown in FIG. 2 and the retraction position shown in FIG. 3, it is only necessary to control the angle of rotation of the motor 64 or provide a stopper which abuts against the pivoting arm 60 or any other appropriate member or portion.

The hatched portion shown FIG. 4 represents the water 76 applied by the felt member 74. The width W of the applied water 76 can be adjusted as desired by varying the the width of the felt member 74. In addition, the arrangement may be such that the felt member 74 is brought into contact with the surface of the image-receiving paper 32 through a plate-like mask which covers any portion of the image-receiving paper 32 which need not be coated with water. In order to prevent any adverse effect on the applied water 76, the feed roller 48 is reduced in diameter at the central portion thereof to define a smaller-diameter portion 48A, so that the feed rollers 48 and 50 hold therebetween only the lateral edge portions of the image-receiving paper 32.

A guide rod 78 is mounted within the tank 66 in such a manner that the axis of the guide bar 78 extends vertically when the water applicator section 34 is in the application position shown in FIG. 2. A float 80 is provided in such a manner as to be movable along the guide rod 78. A magnet 82 is attached to a part of this float 80, so that the magnet 82 moves up and down, together with the float 80, in response to changes in the level of the water 72 contained in the tank 66.

A magnetic sensor 88 is rigidly secured to the pivoting arm 60 through a mounting plate 86 in such a manner that the sensor 88 opposes the magnet 82. Thus, when the water applicator section 34 is in the water application position shown in FIG. 2, and when the magnet 82 reaches a predetermined level or height, the magnetic sensor 88 detects the position of the magnet 82, that is, the level of the water 72, and informs the operator of the shortage of the water 72 in the tank 66 by means of an alarm or the like (not shown). In such case, the operator can supply a necessary amount of water into the tank 66 or replace the tank 66 with another tank 66.

It should be noted that various types of sensor can be employed to detect the amount of water 72 contained in the tank 66. For example, the tank 66 may be made transparent so that the liquid level can be visually checked from the outside.

When the water applicator section 34 is in the retraction position shown in FIG. 3, the tank 66 is pivoted clockwise from the application position, and the felt member 74 is thereby positioned above the level of the water 72. Consequently, the water 72 is not in contact with the felt member 74, so that it is possible to reduce the amount of water 72 vaporizing to the outside through the felt member 74 when the water applicator section 34 is in the retraction position.

As shown in FIG. 1, on the downstream side of the water applicator section 34 is provided an inverting section 90 adapted such that the emulsion-coated side of the image-receiving paper 32 which has been coated with water is made to face the image-carrying side of the photosensitive material 16. In this inverting section 90, the image-receiving paper 32 delivered from the water applicator section 34 is pushed out onto a tray 96 from the leading end of the paper 32 by means of guide rollers 92 and 94. In this case, the guide roller 92 is separated from the guide roller 94 and rotated in the same direction as that of the rotation of the roller 94. After the image-receiving paper 32 has properly been pushed out, the guide roller 92 is brought into contact with the guide roller 94, and the tail end of the image-receiving paper 32 is held therebetween. In this state, the image-receiving paper 32 is fed toward the overlaying section 26 from the tail end which now serves as the leading end, whereby the water-coated side is allowed to face the image-carrying side of the photosensitive material 16.

The operation of this embodiment will be explained below.

The thermal developing photosensitive material 16 drawn out from the magazine 14 is wound around the exposing drum 20 and subjected to light exposure by the exposing head 22 before being sent to the overlaying section 26.

Among the image-receiving sheets of paper 32 accommodated in the cassette 30, the lowermost sheet of paper 32 is transported to the water applicator section 34 by means of the feed rollers 42. In the water applicator section 34, the motor 64 is activated to rotate in synchonism with the transportation of the image-receiving paper 32 so as to bring the tank 66 into the application position shown in FIG. 2. As the image-receiving paper 32 advances, water is applied to the surface of the paper 32, and when a necessary amount of water has been applied, the motor 64 is rotated again so as to cause the tank 66 to pivot to the retraction position shown in FIG. 3.

Thus, it is possible to control as desired the length L of the applied water 76 along the longitudinal direction of the image-receiving paper 32 as shown in FIG. 4. Since the width W of the applied water 76 is controlled by the width of the felt member 74, the water 76 can be applied to only an image transfer portion which needs to be coated with the water 76. The water 76 thus applied passes under the smaller-diameter portion 48A of the feed roller 48, and there is therefore no fear of the applied water 76 being adversely affected by the feed roller 48.

The image-receiving paper 32 coated with water in the water applicator section 34 is inverted in the inverting section 90, delivered to the overlaying section 26 where it is laid on the photosensitive material 16 in such a manner that the water-coated side of the paper 32 faces the image-carrying side of the photosensitive material 16, and then transported to the thermal developing/transfer section 28. In the section 28, thermal development is carried out in the presence of water and, at the same time, the dye image thus formed is heat-transferred to the emulsion-coated side of the image-receiving paper 32. Since a necessary amount of water has already been applied to the image-receiving paper 32 in an appropriate state, it is possible to conduct an extremely excellent transfer operation.

After the completion of the transfer operation, the photosensitive material 16 and the image-receiving paper 32 which remain in close contact with each other are sent from the thermal developing/transfer section 28 to the separating section 36 from which the photosensitive material 16 is deposited in the accommodating means 38 and the image-receiving paper 32 is transported to the delivery section 40 so as to be taken out of the apparatus 10.

Figure 5:
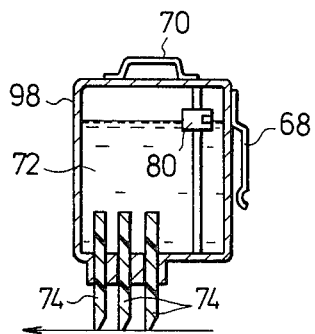
FIG. 5 is a sectional view of a tank employed in a second embodiment of the present invention.

Referring next to FIG. 5, there is shown a tank 98 which is employed in a second embodiment of the present invention. Unlike the tank 66 in the first embodiment, the tank 98 is provided with a plurality (three in this embodiment) of felt members 74. These felt members 74 are disposed in series along the direction in which the image-receiving paper 32 advances, whereby it is possible to reduce uneven application of water due to possible minute irregularities at the distal end portion of each felt member 74.

Although in the above-described embodiments the present invention is applied to an arrangement in which water is applied to the image-receiving paper 32, it is also possible to apply the present invention to an arrangement in which water is applied to the photosensitive material 16. In the above-described embodiments, the felt member(s) 74 is moved from the application position to the retraction position by pivoting the tank 66 through the arm 60. This arrangement is, however, not necessarily limitative, and the tank 66 may be linearly moved away from the image-receiving paper 32 to separate the felt member(s) 74 therefrom. In addition, the arrangement may be such that the felt member(s) 74 is adapted to be movable alone relative to the tank 66 so as to move away from the image-receiving paper 32.

In the above-described embodiments, the felt member(s) 74 is at rest, while the image-receiving paper 32 advances to cause relative movement therebetween. However, the felt member(s) 74 way be driven to move in the direction in which the image-receiving paper 32 advances so that both of them move relative to each other.

Figure 6:
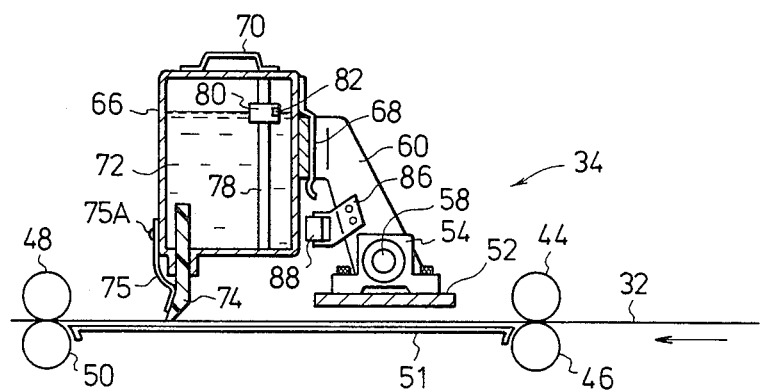
FIG. 6 is a sectional view corresponding to FIG. 2, which shows a third embodiment of the present invention.
Figure 7:
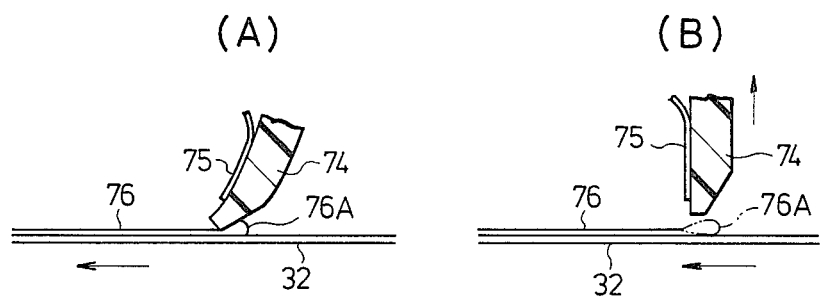
FIGS. 7A and 7B are enlarged views showing the way in which water is applied by a water applicator portion in accordance with the third embodiment.

A third embodiment of the present invention will be explained below with reference to FIGS. 6 and 7. In these Figures, the portions or members having the same arrangements as those shown in FIG. 1 are denoted by the same reference numerals, and description thereof is omitted. This embodiment differs from the first embodiment in that a leaf spring 75 is attached to the tank 66.

More specifically, one end of the leaf spring 75 is rigidly secured to the tank 66 by means of a rivet 75A. The other end of the leaf spring 75 is disposed so as to abut against one side of the distal end portion of the felt member 74, that is, the surface of said portion which faces downstream as viewed in the advancing direction of the image-receiving paper 32. Thus, when water is applied, the leaf spring 75 is deflected as shown in FIG. 7A to allow the felt member 74 to bend. When the felt member 74 is separated from the image-receiving paper 32, the leaf spring 75 causes the felt member 74 to return to the previous linear configuration as shown in FIG. 7B.

In this embodiment, as the image-receiving paper 32 advances, the felt member 74 is bent as shown in FIG. 7A, and in this state, water 76 is applied to the surface of the image-receiving paper 32. In this case, surplus water 76A is gathered on the other side of the felt member 74.

When a necessary amount of water has been applied, the motor 64 is activated to rotate again so as to pivot the tank 66 to the retraction position shown in FIG. 3 which illustrates the first embodiment. In this way, it is possible to contol as desired the application length L along the longitudinal direction of the image-receiving paper 32 as shown in FIG. 4 which illustrates the first embodiment.

In this case, as shown in FIG. 7B, the leaf spring 75 causes the felt member 74 to return to the previous straight position when the felt member 74 is separated from the image-receiving paper 32, and this movement of the felt member 74 allows the surplus water 76A formed as shown in FIG. 7A to be stretched upstream as viewed in the advancing direction of the image-receiving paper 32 (i.e., toward the feed roller 44). Accordingly, no surplus water 76a such as that shown by the imaginary line in FIG. 7B is left, and variations in the image transfer efficiency are reduced advantageously.

Although a leaf spring is employed in the above-described embodiment, it is not necessarily limitative, and any other resilient member may be employed. The resilient member may be buried in the felt member 74. In addition, it is not necessary to employ any separate resilient member, provided that the applicator member 74 is made of a material having adequate resilience.

Figure 8:
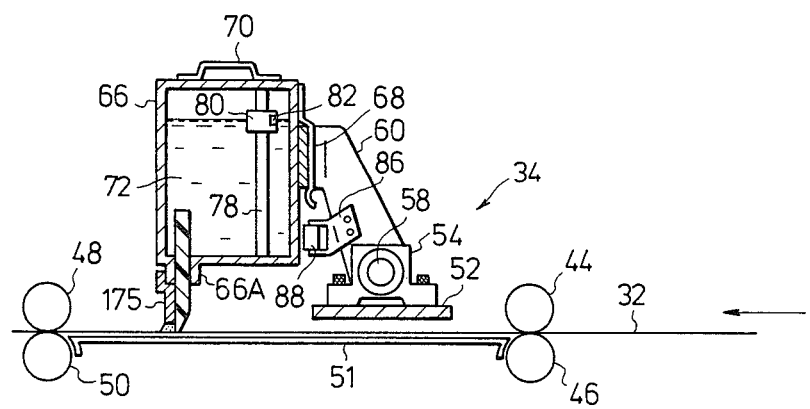
FIG. 8 is a sectional view corresponding to FIG. 2, which shows a fourth embodiment of the present invention.
Figure 9:
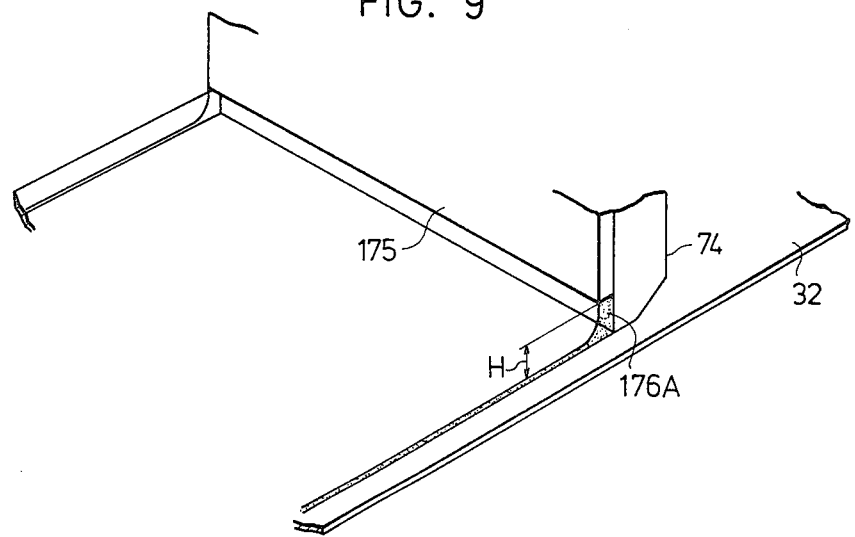
FIG. 9 is an enlarged perspective view showing the way in which water is applied by a water applicator portion in accordance with the fourth embodiment.

A fourth embodiment of the present invention will be explained below with reference to FIGS. 8 and 9. This embodiment, which is similar to the third embodiment, has an arrangement similar to that of the first embodiment but differs therefrom in that a plate member 175 is provided adjacent to the felt member 74 as shown in FIG. 8, the plate member 175 serving as a means for limiting the height of solvent beads formed on the downstream side of the felt member 74. The plate member 175 is made of a non-water absorbent material such as a metal or a synthetic resin. The proximal portion of the plate member 175 is secured by, for example, welding, to a felt retaining neck portion 66A formed on the tank 66. The distal end of the plate member 175 extends along the felt member 74 and terminates at a position which is slightly back from the distal end of the felt member 74.

Accordingly, the plate member 175 limits the height of the solvent beads 176A formed on the downstream side of the felt member 74 to the height H (about 0.1 to 2 mm) which is equal to the distance from the surface of the image-receiving paper 32 to the distal end of the plate member 175. The height H of the solvent beads 176A is constant in the width direction of the image-receiving paper 32. In other words, if the plate member 175 were not provided, possible minute irregularities at the distal end of the felt member 74 might cause the height H of the solvent beads 176A to be uneven, resulting in uneven application of a solvent such as water.

It should be noted that the plate member 75 may be slightly spaced away from the felt member 74 rather than disposed in close contact with it.

By virtue of the above-described arrangement, the felt member 74 can coat the image-receiving paper 32 with water 76 having a uniform thickness. More specifically, when the applied water 76 contacts the image-receiving paper 32, sovent beads 176A are formed on the paper 32 as shown in FIG. 9. The height H of the solvent beads 176A is accurately maintained at a constant value by the presence of the plate member 175. Accordingly, the thickness of the water 76 applied to the image-receiving paper 32 is made uniform.

In a manner similar to that in the first embodiment, the length L and the width W of water applied to the image-receiving paper 32 are accurately maintained at constant levels in accordance with the period of time during which the felt member 74 is in contact with the image-receiving paper 32 and the width of the felt member 74, respectively. Thus, it is possible to uniformly apply the water 76 only to an image transfer portion which needs to be coated with water 76.

The water 76 thus applied passes under the smaller-diameter portion 48A of the feed roller 48, and there is therefore no fear of the applied water 76 being adversely affected by the feed roller 48.

Although in this embodiment the plate member 175 is secured to the felt retaining neck portion 66A so as to serve as a limiting means, the neck portion 66A itself may be extended in such a manner that, when the water applicator section 34 is in the application position, the distal end of the neck portion 66A faces the image-receiving paper 32 at a distance which equal to the height H.

Figure 10:
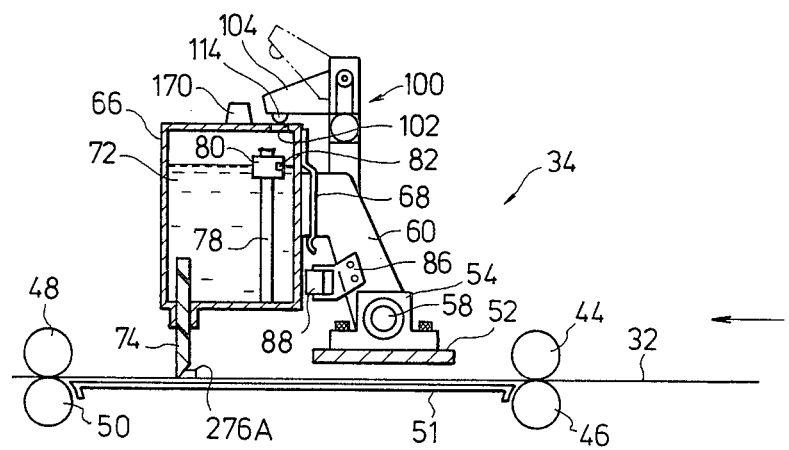
FIG. 10 is a sectional view corresponding to FIG. 2, which shows a fifth embodiment of the present invention.

A fifth embodiment of the present invention will be explained below with reference to FIGS. 10 to 12. In this embodiment also, description of the same portions and members as those in the first embodiment is omitted.

In this embodiment, a handle 170 attached to the top of the tank 66 is disposed in such a manner that the axis of the handle 170 extends in a direction which intersects at 90° the direction in which the axis of the handle 70 of the first embodiment extends. This is because an opening and closing means 100 needs to be disposed in a part of the top of the tank 66.

An opening 102 is provided in the top of the tank 66. The opening 102 can be selectively opened and closed by the opening and closing means 100 which is provided in a part of the top of the tank 66. The opening 102 extends through the top panel of the tank 66 so that the inside and outside of the tank 66 are communicated with each other through the opening 102.

Figure 11:
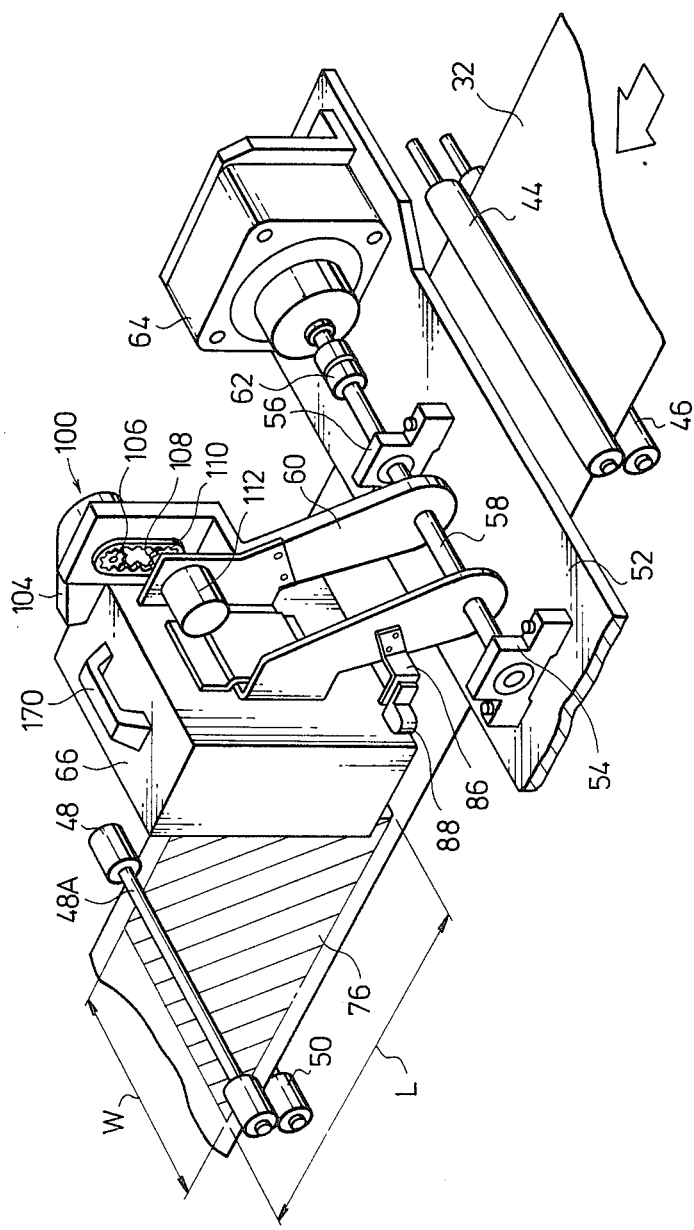
FIG. 11 is a perspective view showing the water applicator section according to the fifth embodiment in the application position.
Figure 12:
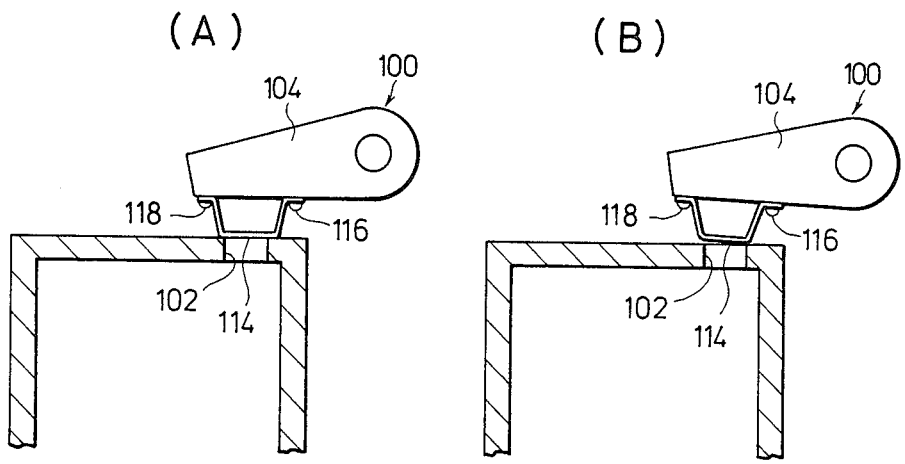
FIGS. 12A and 12B are enlarged sectional views showing the operation of the opening and closing means employed in the fifth embodiment.

The opening and closing means 100 is, as shown in FIG. 11, provided with an arm 104 which is pivotally supported at the upper end portion of the pivoting arm 60. The arm 104 is subjected to the rotational force of a motor 112 in both forward and backward directions through a gear 106, a timing chain 106 and a gear 110.

As shown in FIGS. 12A and 12B in detail, a leaf spring 114 is secured at both end portions thereof to the distal end portion of the arm 104 by means of rivets 116 and 118. The center of the leaf spring 114 is bent away from the arm 104, so that, when the arm 104 moves toward the tank 66, the leaf spring 114 can close the opening 102 by virtue of the elastic deformation thereof.

More specifically, when the arm 104 is strongly pressed against the tank 66 as shown in FIG. 12A, the leaf spring 114 comes in close contact with the whole area of the opening 102 so as to be tightly closed, thereby shutting off the inside and outside of the tank 66 from each other, and thus preventing the outside air from communicating with the water 72 contained in the tank 66. When the arm 104 is moved away from the tank 66 as shown in FIG. 12B, a part of the leaf spring 116 opens the opening 102, thereby allowing the outside air to apply back pressure to the water 72 in the tank 66. The arm 104 can be pivoted gradually, and it is therefore possible to control the arm 104 such that the leaf spring 114 gradually closes the opening 102 immediately before the tank 66 which is in the application position shown in FIG. 10 is pivoted and the felt member 74 is thereby separated from the image-receiving paper 32.

Accordingly, when the felt member 74 which is applying water over a necessary length L reaches a position near the rear end of the coating of water to be applied, the leaf spring 114 starts to close the opening 102 gradually, so that the back pressure applied to the water 72 is gradually removed, thereby decreasing the amount of water 72 supplied to the felt member 74.

In order to allow the leaf spring 114 to close the opening 102 reliably and effectively, the width of the leaf spring 114 (the dimension thereof in a direction perpendicular to the axis of the arm 104) is made larger than the width of the opening 102. In addition, a sealing member made of rubber or the like may be provided on the leaf spring 114 or at the opening 102 in order to ensure the close contact therebetween.

The operation of this embodiment will be explained below.

The thermal developing photosensitive material 16 is processed and transported to the overlaying section 26 in a manner similar to that in the first embodiment.

The lowermost one of the image-receiving sheets of paper 32 accommodated in the cassette 30 is sent to the water applicator section 34 in the same manner as that in the first embodiment. The motor 64 is activated to rotate in synchronism with the transportation of the image-receiving paper 32 so as to allow the tank 66 to pivot from the retraction position to the application position as shown in FIG. 10.

In this state, the leaf spring 114 of the opening and closing means 100 allows the opening 102 to remain open, and the outside air therefore acts on the water 72 in the tank 66 so as to permit the felt member 74 to be sufficiently supplied with the water 72. Accordingly, as the image-receiving paper 32 advances, the water 76 is applied to the surface of the image-receiving paper 32 from the felt member 74.

When a necessary amount of water 76 has been applied, the motor 64 is activated to rotate again so as to pivot the tank 66 to the retraction position, whereby it is possible to control as desired the length L of the applied water 76 in the longitudinal direction of the image-receiving paper 32 as shown in FIG. 11.

In this embodiment also, the tank 66 is pivoted between the application position and the retraction position by rotating the motor 64 in the same manner as that in the first embodiment. However, in this embodiment, the retraction position is closer to the application position than that in the first embodiment shown in FIG. 3. More specifically, when the water applicator section 34 is in the retraction position, the level of the water contained in the tank 66 does not reach the inner surface of the top panel of the tank 66.

In this embodiment, when the felt member 74 reaches a position near the rear end of the coating of water 76 which is to be applied over a necessary length, the motor 112 for the gear 110 is started so that the leaf spring 114 gradually closes the opening 102 from the state shown in FIG. 12B to the state shown in FIG. 12A. In consequence, the tank 66 is shut off from the outside air, and the back pressure acting on the water 72 is gradually reduced, so that, as the felt member 74 approaches the rear end of the coating of water 76, the amount of water 72 supplied to the felt member 74 decreases gradually.

As a result, no surplus water gathers at the rear end of the applied water 76, and the water 76 can be applied with a uniform thickness.

If the tank 66 were pivoted to the retraction position with the opening 102 of the opening and closing means left open, since the water 72 which is affluently supplied to the felt member 74 causes surplus water 276A to gather at a portion of the felt member 74 which contacts the image-receiving paper 32, this surplus water 276A would remain at the rear end of the applied water 76, and the surplus water 276A might be squeezed to overflow during a transfer operation, resulting disadvantageously in variations in the image transfer efficiency.

In this embodiment also, the water 76 thus applied passes under the smaller-dimater portion 48A of the feed roller 48 in a manner similar to that in the first embodiment. There is therefore no fear of the applied water 76 being adversely affected by the feed roller 48.

The opening and closing means 100 employed in the present invention is not necessarily limited to the leaf spring 114 exemplified in this embodiment, and it is also possible to employ other type of opening and closing means such as a means having a valve structure. In addition, the applicator means for applying water from the tank 66 to the image-receiving paper 32 is not necessarily limitative to the felt member 74, and other type of applicator means such as a capillary may be employed.

A sixth embodiment of the present invention will be explained below with reference to FIGS. 13 to 16.

This embodiment differs from the above-described embodiments in the arrangement of the water applicator section. The differences of this embodiment from the above-described embodiments will mainly be described below in detail.

Figure 15:
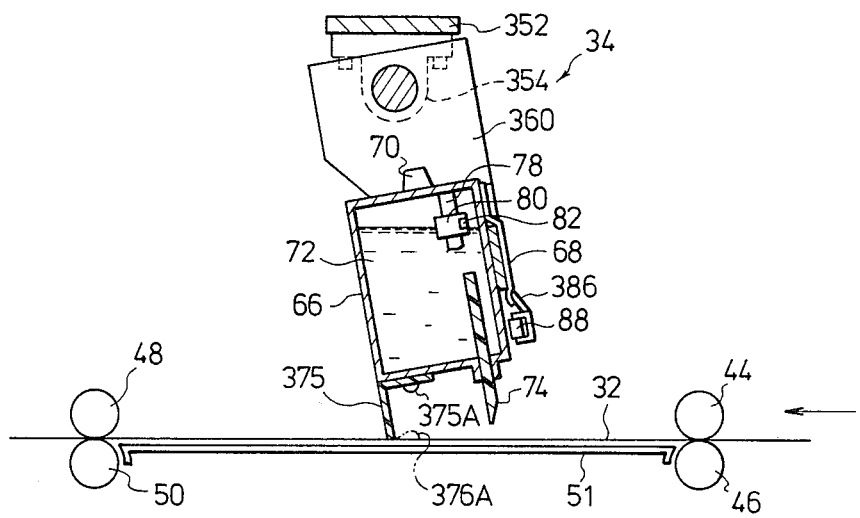
FIG. 15 shows the water applicator section according to the sixth embodiment in the water absorbing position.

As shown in FIG. 15, a bracket 352 is stretched between the feed rollers 44 and 48 in such a manner that the bracket 352 is positioned in close proximity with the image transfer surface, that is, the emulsion-coated side, of the transported image-receiving paper 32. A rotary shaft 358 is rotatably supported on the lower side of the bracket 352 through a pair of bearings 354, 356. A pivoting arm 360 is rigidly secured to the rotary shaft 358. The pivoting arm 360 is formed from a plate material in such a manner that two end portions of the plate material are bent at right angle so as to extend parallel with each other, the arm 360 being rigidly secured at these extended portions to the rotary shaft 358.

Figure 13:
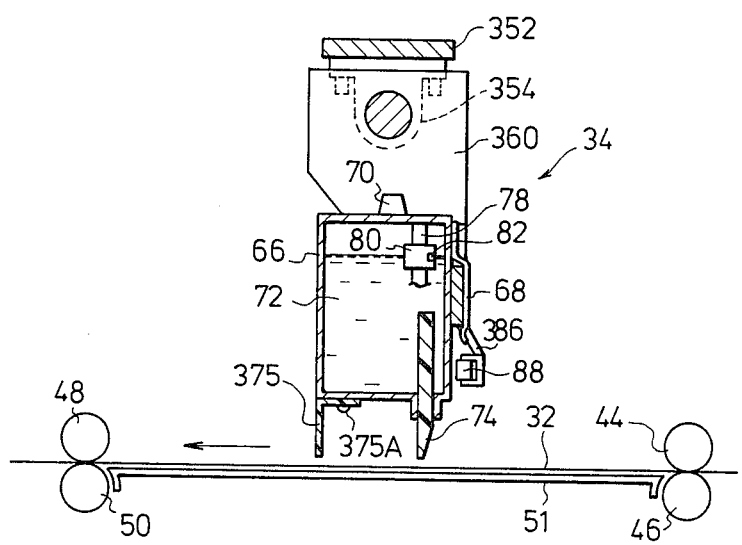
FIG. 13 is an enlarged sectional view showing the water applicator section according to the sixth embodiment in the neutral position.
Figure 14:
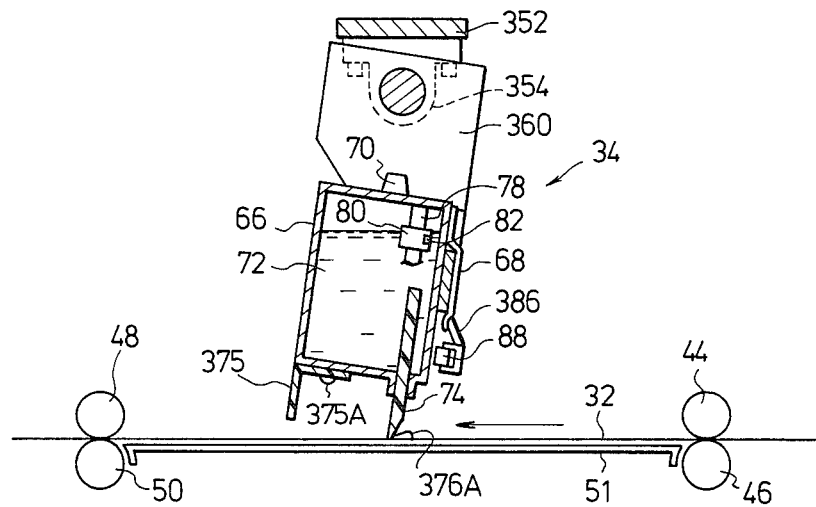
FIG. 14 shows the water applicator section according to the sixth embodiment in the application position.

One end portion of the rotary shaft 358 which projects from the bearing 356 is connected to a motor 364 through a coupling 362, so that the shaft 358 which is subjected to the rotational force from the motor 364 can make the arm 360 pivot between the position shown in FIG. 14 and the position shown FIG. 15 through the position shown in FIG. 13.

A clip 68 is rigidly secured at one end thereof to one side wall of a tank 66 and fitted on the central portion of the pivoting arm 360, whereby the tank 66 is mounted on the arm 360. A handle 70 is provided on the top of the tank 66 in the same manner as that in the fifth embodiment. When an operator holds this handle 70 and raises it upwardly, the clip 68 comes off the pivoting arm 360, thereby allowing the tank 66 to be removed. For this purpose, the clip 68 is preferably made of a leaf spring material.

As shown in FIG. 13, the tank 66 contains water 72 which serves as an image forming solvent. The water 72 is applied to the surface of the image-receiving paper 32 through a porous felt member 74. More specifically, one end of the felt member 74 is inserted into the tank 66, while the distal end portion, that is, an applicator portion, of the felt member 74 which projects from the tank 66 is brought into contact with the surface of the image-receiving paper 32 as shown in FIG. 14, and in this state, the felt member 74 can apply the water impregnated therein to the central portion of the surface of the image-receiving paper 32 (this position will hereinafter be referred to as the "application position"). In the state shown in FIG. 15, since the felt material 74 is separated from the image-receiving paper 32, no application of water is effected (this position will hereinafter be referred to as to the "retraction position"), and the inner end of the felt member 74 is separated from the water 72 contained in the tank 66.

A porous water absorbing felt member 375 which constitutes water absorbing means is rigidly secured at one end thereof to the tank 66. When the water applicator section 34 is pivoted to a water absorbing position shown in FIG. 15, the other end of this felt member 375 is brought into contact with the rear end of the water 76 applied to the image-receiving paper 32 (see the hatched portion shown in FIG. 16) so as to absorb any surplus water gathered at the rear end of the applied water 76.

Figure 16:
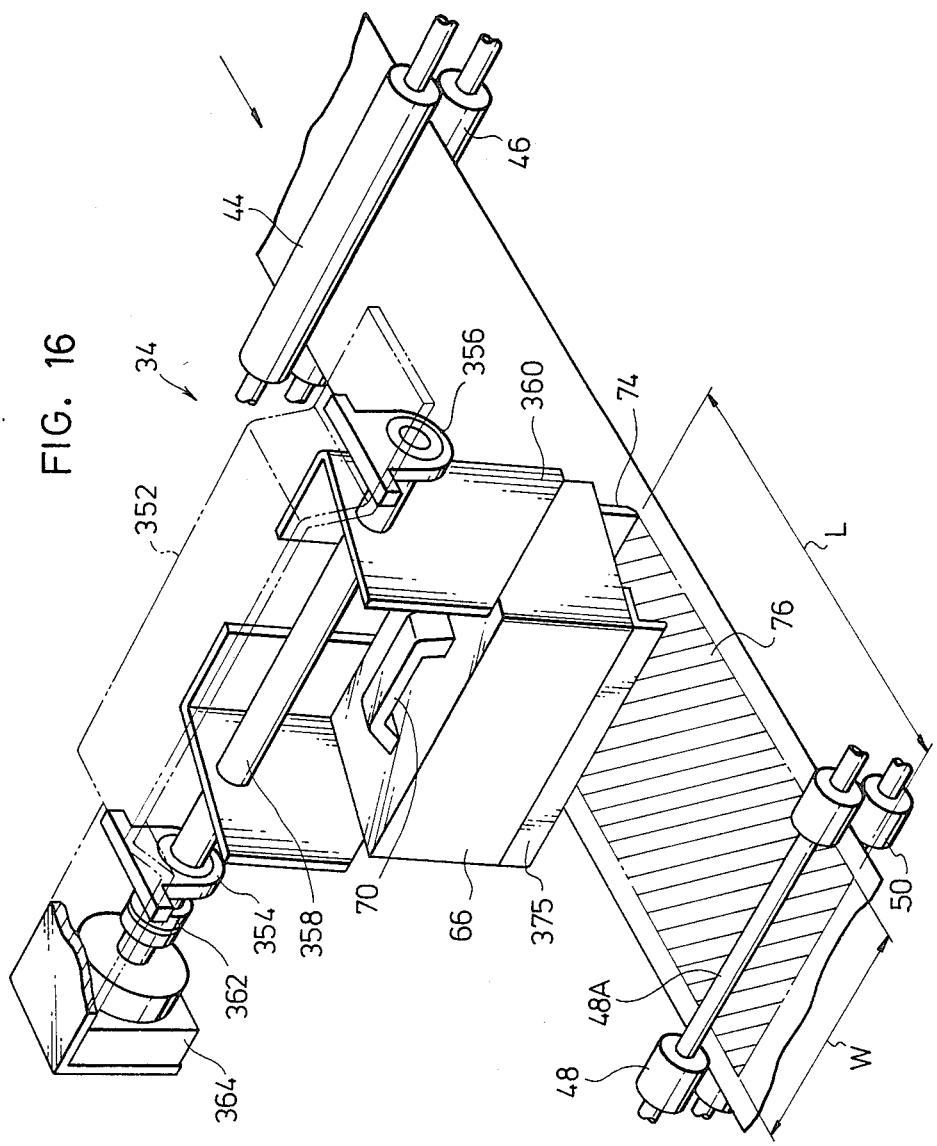
FIG. 16 is a perspective view of the water applicator section according to the sixth embodiment in the application position.

The hatched portion shown FIG. 16 represents the water 76 applied by the felt member 74. The width W of the applied water 76 can be adjusted as desired by varying the the width of the felt member 74. In addition, the arrangement may be such that the felt member 74 is brought into contact with the surface of the image-receiving paper 32 through a plate-like mask which covers any portion of the image-receiving paper 32 which need not be coated with water. In order to prevent any adverse effect on the applied water 76, the feed roller 48 is reduced in diameter at the central portion thereof to define a smaller-diameter portion 48A, so that the feed rollers 48 and 50 hold therebetween only the lateral edge portions of the image-receiving paper 32.

It should be noted that, to enable the tank 66 to be accurately stopped at the water absorbing position shown in FIG. 15 when moving from the application position shown in FIG. 14 through the neutral position shown in FIG. 13, it is only necessary to control the angle of rotation of the motor 64 or provide a stopper which abuts against the pivoting arm 360 or any other appropriate member or portion.

In the same manner as that in the above-described embodiments, a guide rod 78 is mounted within the tank 66 in such a manner that a float 80 is movable along the guide rod 78. A magnet 82 is attached to a part of this float 80, so that the magnet 82 moves up and down, together with the float 80, in response to changes in the level of the water 72 contained in the tank 66.

A magnetic sensor 88 is rigidly secured to the pivoting arm 360 through a mounting plate 386 in such a manner that the sensor 88 opposes the magnet 82. Thus, when the water applicator section 34 is in the water application position shown in FIG. 14, and when the magnet 82 reaches a predetermined level or height, the magnetic sensor 88 detects the position of the magnet 82, that is, the level of the water 72, and informs the operator of the shortage of the water 72 in the tank 66 by means of an alarm or the like (not shown). In such case, the operator can supply a necessary amount of water into the tank 66 or replace the tank 66 with another tank 66.

As shown in FIG. 1, on the downstream side of the water applicator section 34 is provided an inverting section 90 adapted such that the emulsion-coated side of the image-receiving paper 32 which has been coated with water is made to face the image-carrying side of the photosensitive material 16. In this inverting section 90, the image-receiving paper 32 delivered from the water applicator section 34 is pushed out onto a tray 96 from the leading end of the paper 32 by means of guide rollers 92 and 94. In this case, the guide roller 92 is separated from the guide roller 94 and rotatated in the same direction as that of the rotation of the roller 94. After the image-receiving paper 32 has properly been pushed out, the guide roller 92 is brought into contact with the guide roller 94, and the tail end of the image-receiving paper 32 is held therebetween. In this state, the image-receiving paper 32 is fed toward the overlaying section 26 from the tail end which now serves as the leading end, whereby the water-coated side is allowed to face the image-carrying side of the photosensitive material 16.

The operation of this embodiment will be explained below.

The thermal developing photosensitive material 16 drawn out from the magazine 14 is wound around the exposing drum 20 and subjected to light exposure by the exposing head 22 before being sent to the overlaying section 26.

Among the image-receiving sheets of paper 32 accommodated in the cassette 30, the lowermost sheet of paper 32 is transported to the water applicator section 34 by means of the feed rollers 42. In the water applicator section 34, the motor 64 is activated to rotate in synchonism with the transportation of the image-receiving paper 32 so as to bring the tank 66 into the application position shown in FIG. 14. As the image-receiving paper 32 advances, water is applied to the surface of the paper 32. In this case, surplus water 376A is gathered on one side of the water applicator felt member 74.

When a necessary amount of water has been applied, the motor 64 is rotated again so as to cause the tank 66 to pivot to the neutral position shown in FIG. 13. Thus, it is possible to control as desired the length L of the applied water 76 along the longitudinal direction of the image-receiving paper 32 as shown in FIG. 16. Since the width W of the applied water 76 is controlled by the width of the felt member 74, the water 76 can be applied to only an image transfer portion which needs to be coated with the water 76.

Immediately thereafter, the motor 64 is activated to rotate so as to pivot the water applicator section 34 from the application position shown in FIG. 14 to the water absorbing position shown in FIG. 15 (alternatively, the water applicator section 34 may not be stopped at the neutral position shown in FIG. 13). In consequence, the surplus water 376A is absorbed by the water absorbing felt member 375, so that variations in the image transfer efficiency are reduced.

The water 76 thus applied passes under the smaller-diameter portion 48A of the feed roller 48, and there is therefore no fear of the applied water 76 being adversely affected by the feed roller 48.

The processsing carried out thereafter is similar to that in the above-described embodiments.

Although in this embodiment the water applicator felt member 74 and the water absorbing felt member 375 are moved from the application position to the neutral position and the water absorbing position by pivoting the tank 66, this arrangement is not necessarily limitative, and the water applicator felt member 74 and the water absorbing felt member 375 are adapted to be movable alone relative to the tank 66 which is fixed so that the felt members 74 and 375 move toward and away from the image-receiving paper 32.

A seventh embodiment of the present invention will be explained below with reference to FIGS. 17 to 20.

Figure 17:
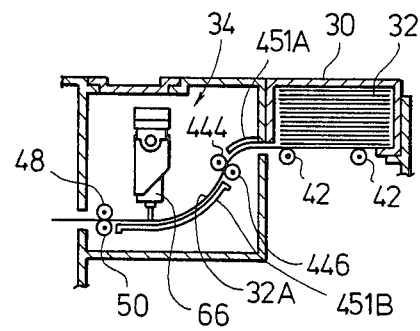
FIG. 17 is a sectional view of a seventh embodiment of the present invention.

As shown in FIG. 17, a multiplicity of image-receiving sheets of paper 32 are accommodated in a cassette 30 in the same manner as that in the above-described embodiments and subjected to driving force from feed rollers 42 in such a manner that the the lowermost sheet of paper 32 is fed to the water applicator section 34.

In the water applicator section 34, a pair of feed rollers 444, 446 adapted to feed the image-receiving paper 32 held therebetween are disposed in close proximity with the cassette 30. A pair of feed rollers 48, 50 are disposed on the downstream side of these feed rollers 444, 446 in such a manner that they feed the image-receiving paper 32 held therebetween. These rollers are rotated by the driving force derived from a motor (not shown) so as to transport the image-receiving paper 32 toward the overlaying section 26. Between these pairs of feed rollers, curved guide plates 451A and 451B are provided in opposing relation to the obverse and reverse sides (the emulsion-coated side and the side opposite to the emulsion-coated side), respectively, of the image-receiving paper 32 being transported, thereby bending the image-receiving paper 32 so as to form a bent portion 32A which moves while drawing a gentle S-shaped curve.

Figure 20:
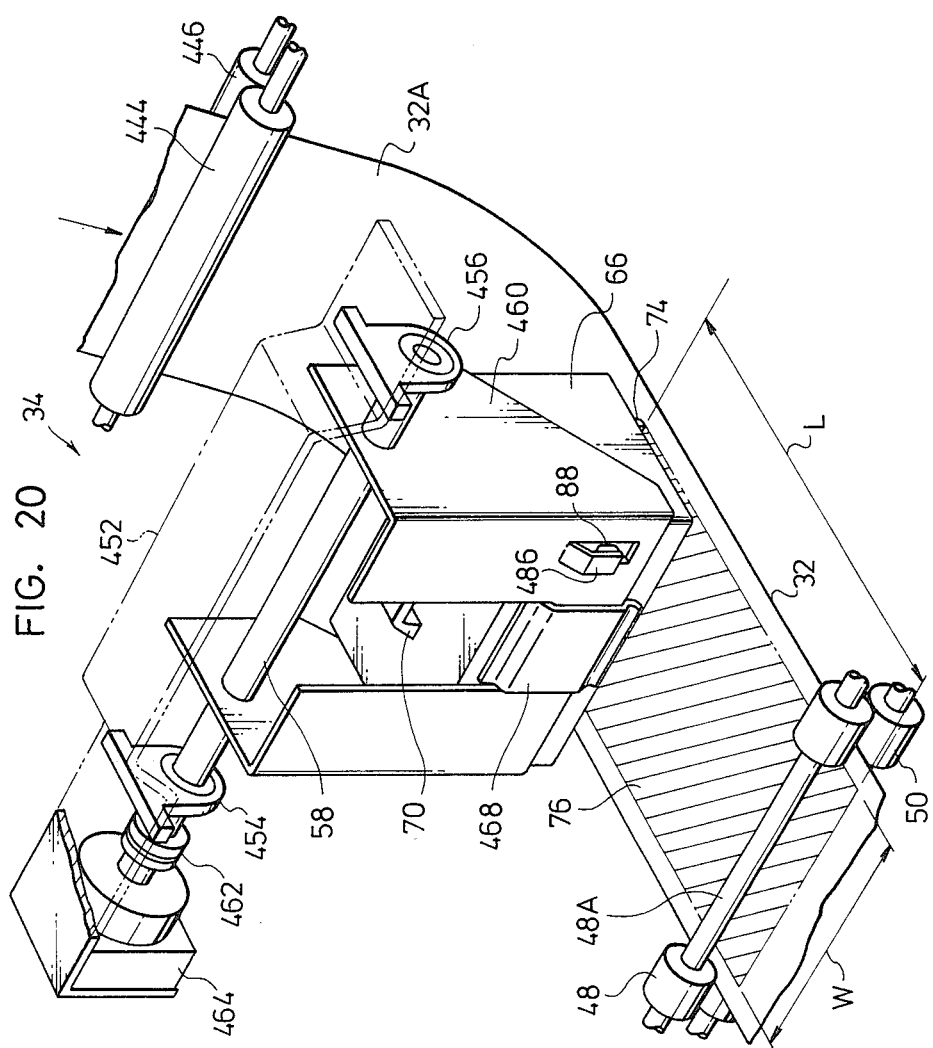
FIG. 20 is a perspective view showing the water applicator section according to the seventh embodiment in the application position.

As also shown in FIG. 20, a bracket 452 is stretched between the feed rollers 444 and 48 in such a manner that the bracket 452 is positioned in close proximity with the image transfer surface, that is, the emulsion-coated side, of the transported image-receiving paper 32. A rotary shaft 458 is rotatably supported on the bracket 452 through a pair of bearings 454, 456. A pivoting arm 460 is rigidly secured to the rotary shaft 458. The pivoting arm 460 is formed from a plate material in such a manner that two end portions of the plate material are bent at right angle so as to extend parallel with each other, the arm 460 being rigidly secured at these extended portions to the rotary shaft 458.

Figure 18:
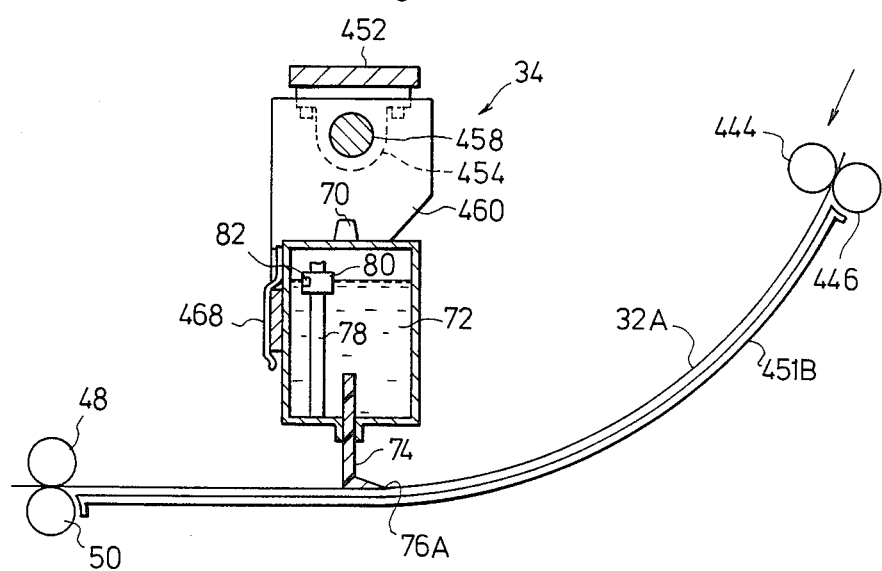
FIG. 18 is an enlarged view showing the water applicator section according to the seventh embodiment in the application position.
Figure 19:
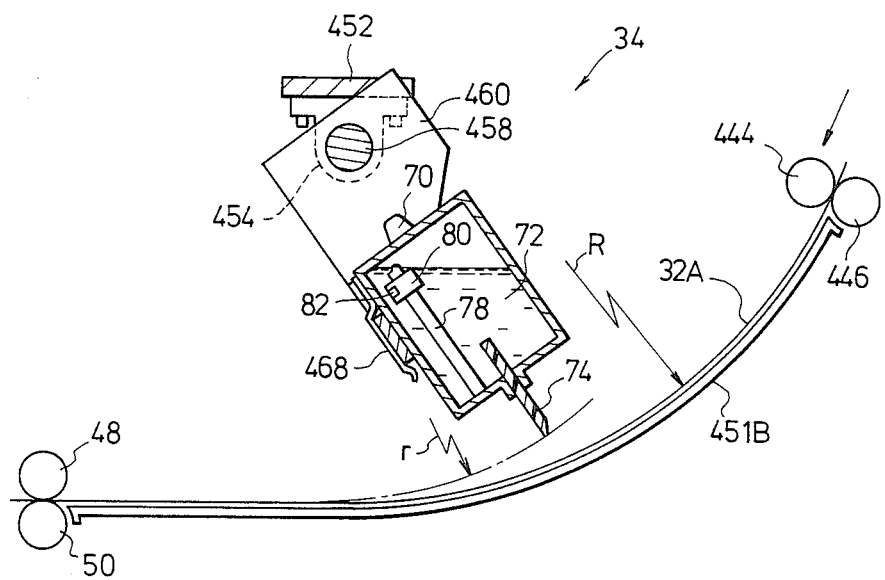
FIG. 19 shows the water applicator section according to the seventh embodiment in the retraction position.

One end portion of the rotary shaft 458 which projects from the bearing 456 is connected to a motor 464 through a coupling 462, so that the shaft 458 which is subjected to the rotational force from the motor 464 can make the arm 460 pivot between the position shown in FIG. 18 and the position shown FIG. 19.

A clip 468 is rigidly secured at one end thereof to one side wall of a tank 66 and fitted on the central portion of the pivoting arm 460, whereby the tank 66 is mounted on the arm 460. A handle 70 is provided on the top of the tank 66. When an operator holds this handle 70 and raises it upwardly from the position shown in FIG. 18 or 20, the clip 468 comes off the pivoting arm 460, thereby allowing the tank 66 to be removed. For this purpose, the clip 468 is preferably made of a leaf spring material.

As shown in FIG. 18, the tank 66 contains water 72 which serves as an image forming solvent. The water 72 is applied to the surface of the image-receiving paper 32 through a porous felt member 74. More specifically, one end of the felt member 74 is inserted into the tank 66, while the distal end portion, that is, an applicator portion, of the felt member 74 which projects from the tank 66 is brought into contact with the surface of the image-receiving paper 32 as shown in FIGS. 18 and 20, and in this state, the felt member 74 can apply the water impregnated therein to the central portion of the surface of the image-receiving paper 32 (this position will hereinafter be referred to as the "application position"). In the state shown in FIG. 19, since the felt material 74 is separated from the image-receiving paper 32, no application of water is effected (this position will hereinafter be referred to as the "retraction position").

The locus of movement of the felt member 74 when moving from the application position to the retraction position has a radius of curvature r which is slightly smaller than the radius of curvature R of the locus of movement of the bent portion 32A of the image-receiving paper 32. Thus, the felt member 74 is gradually moved away from the image-receiving paper 32.

It should be noted that, to enable the tank 66 to be accurately stopped at the application position shown in FIG. 18 and the retraction position shown in FIG. 19, it is only necessary to control the angle of rotation of the motor 464 or provide a stopper which abuts against the pivoting arm 460 or any other appropriate member or portion.

The hatched portion shown FIG. 20 represents the water 76 applied by the felt member 74. The width W of the applied water 76 can be adjusted as desired by varying the the width of the felt member 74. In addition, the arrangement may be such that the felt member 74 is brought into contact with the surface of the image-receiving paper 32 through a plate-like mask which covers any portion of the image-receiving paper 32 which need not be coated with water. In order to prevent any adverse effect on the applied water 76, the feed roller 48 is reduced in diameter at the central portion thereof to define a smaller-diameter portion 48A, so that the feed rollers 48 and 50 hold therebetween only the lateral edge portions of the image-receiving paper 32.

A guide rod 78 is mounted within the tank 66 in such a manner that the axis of the guide bar 78 extends vertically when the water applicator section 34 is in the application position shown in FIG. 18. A float 80 is provided in such a manner as to be movable along the guide rod 78. A magnet 82 is attached to a part of this float 80, so that the magnet 82 moves up and down, together with the float 80, in response to changes in the level of the water 72 contained in the tank 66.

A magnetic sensor 88 is rigidly secured to the pivoting arm 60 through a mounting plate 486 in such a manner that the sensor 88 opposes the magnet 82. Thus, when the water applicator section 34 is in the water application position shown in FIG. 18, and when the magnet 82 reaches a predetermined level or height, the magnetic sensor 88 detects the position of the magnet 82, that is, the level of the water 72, and informs the operator of the shortage of the water 72 in the tank 66 by means of an alarm or the like (not shown). In such case, the operator can supply a necessary amount of water into the tank 66 or replace the tank 66 with another tank 66.

The arrangements of the other portions and members of this embodiment are the same as those in the first embodiment.

The operation of this embodiment will be explained below.

Among the image-receiving sheets of paper 32 accommodated in the cassette 30, the lowermost sheet of paper 32 is transported to the water applicator section 34 by means of the feed rollers 42. In the water applicator section 34, the motor 464 is activated to rotate in synchonism with the transportation of the image-receiving paper 32 so as to bring the tank 66 into the application position shown in FIG. 18.

As the image-receiving paper 32 advances, the felt member 74 applies the water 72 in the tank 66 to the surface of the image-receiving paper 32. In this case, surplus water 476A is gathered on the upstream side of the felt member 74.

When a necessary amount of water has been applied, the motor 464 is rotated again so as to cause the tank 66 to pivot to the retraction position shown in FIG. 19. Thus, it is possible to control as desired the length L of the applied water 76 along the longitudinal direction of the image-receiving paper 32 as shown in FIG. 20.

Thus, when the felt member 74 is moved to the retraction position, the tank 66 is pivoted about the rotary shaft 458. Therefore, the speed of relative movement between the image-receiving paper 32 and the felt member 74 is higher than that during application of water, so that the felt member 74 is gradually moved away from the image-receiving paper 32. In consequence, the surplus water 474A gathered on the upstream side of the felt member 74 is stretched, and the amount of water applied from the felt member 74 to the image-receiving paper 32 is gradually reduced. There is therefore no fear of any abnormally surplus water being left at the rear end of the applied water 76. In particular, the image-receiving paper 32 is provided with the bent portion 32A so that the paper 32 moves while allowing the upstream side thereof to appoach the water applicator member. Accordingly, the felt member 74 is able to move away from the image-receiving paper 32 gradually when moving to the retraction position.

Since the width W of the applied water 76 is controlled by the width of the felt member 74, the water 76 can be applied to only an image transfer portion which needs to be coated with the water 76. The water 76 thus applied passes under the smaller-diameter portion 48A of the feed roller 48, and there is therefore no fear of the applied water 76 being adversely affected by the feed roller 48.

Although in this embodiment the felt member 74 is adapted to gradually move away from the image-receiving paper 32 while performing a circular motion together with the tank 66, the arrangement may be such that the felt member 74 is linearly moved in the direction counter to the transporting direction of the image-receiving paper 32, and while being moved linearly, the felt member 74 is moved away from the image-receiving paper 32.

In addition, when the felt member 74 is moved away from the image-receiving paper 32, the paper 32 may be temporarily fed at a rate which is higher than a normal feed rate, thereby increasing the speed of relative movement between the felt member 74 and the image-receiving paper 32. Further, the felt member 74 may be moved alone rather than together with the tank 66.

What is claimed is:

1. An image recording method wherein an image recorded on a thermal developing photosensitive material is transferred to an image-receiving material in the presence of an image forming solvent so as to be formed on the image-receiving material, which comprises the steps of:
   (a) moving a water absorbent applicator member which retains said image forming solvent and either said thermal developing photosensitive material or said image-receiving material relative to each other;
   (b) bringing said applicator member into contact with the surface of either said thermal developing photosensitive material or said image-receiving material; and
   (c) separating said applicator member from the surface of either said thermal developing photosensitive material or said image-receiving material, and
   wherein the step of moving said applicator member and either said thermal developing photosensitive material or said image-receiving material relative to each other comprises contacting the peripheral surface of either said thermal developing photosensitive material or said image-receiving material with pinch rollers, and wherein said applicator member is brought into contact with a portion of the surface of either said thermal developing photosensitive material or said image-receiving material between the contact regions of said pinch rollers.

2. An image recording method according to claim 1, wherein the speed at which said applicator member is separated from the surface of either said thermal developing photosensitive material or said image-receiving material is higher than the speed of relative movement between said applicator member and either said thermal developing photosensitive material or said image-receiving material when said applicator member is in contact with the surface of either said thermal developing photosensitive material or said image-receiving material.

3. An image recording method according to claim 1, wherein the relative movement between said applicator member and either said thermal developing photosensitive material or said image-receiving material is performed in such a manner that either said thermal developing photosensitive material or said image-receiving material defines a locus with a radius of curvature R, while the separation of said applicator member is carried out in such a manner that said applicator member moves through a locus with a radius of curvature r which is smaller than R, whereby said applicator member is gradually moved away from the surface of either said thermal developing photosensitive material or said image-receiving material.

4. An image recording apparatus wherein an image recorded on a thermal developing photosensitive material is transferred to an image-receiving material in the presence of an image forming solvent so as to be formed on the image-receiving material, which comprises:
   (a) a tank containing said image forming solvent;
   (b) an applicator member having water absorption properties, one end of said applicator member being inserted into said tank, and the other end of said applicator member projecting outward from said tank, so that said applicator member retains said image forming solvent and serves as an applicator portion;
   (c) moving means for moving said applicator member and either said thermal developing photosensitive material or said image-receiving material relative to each other; and
   (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said position, and
   wherein said applicator member is provided on the lower portion of said tank, said driving means comprising means for pivoting said tank between said application position and said retraction position.

5. An image recording apparatus according to claim 4, wherein a plurality of said applicator members are disposed in series along the direction in which said image forming solvent is applied.

6. An image recording apparatus according to claim 4, wherein, at said application position, said applicator member is pressed against the surface of either said thermal developing photosensitive material or said image-receiving material so that the distal end portion thereof is bent, and in this state, said applicator member applies said image forming solvent to the surface of either said thermal developing photosensitive material or said image-receiving material, said image recording apparatus further comprising a resilient member disposed on downstream side of said applicator member as viewed in the direction of said relative movement so as to cancel said bend of said applicator member when being separated from the surface of either said thermal developing photosensitive material or said image-receiving material, thereby spreading any surplus solvent gathered at the rear end of coating of said image forming solvent applied to the surface of either said thermal developing photosensitive material or said image-receiving material.

7. An image recording apparatus according to claim 6, wherein said resilient member is a spring member provided so as to extend along said applicator member.

8. An image recording apparatus according to claim 7, wherein said spring member is a leaf spring.

9. An image recording apparatus according to claim 4, further comprising limiting means disposed adjacent to said applicator member to limit the height of a solvent bead formed on the downstream side of said applicator member.

10. An image recording apparatus according to claim 9, wherein said limiting means is an non-water absorbent plate member disposed on the downstream side of said applicator member as viewed in the direction of said relative movement.

11. An image recording apparatus according to claim 4, further comprising absorbing means for absorbing any surplus solvent by contacting the rear end of the coating of said image forming solvent applied to the surface of either said thermal developing photosensitive material or said image-receiving material.

12. An image recording apparatus according to claim 11, wherein said applicator member is provided on the lower portion of said tank, said absorbing means being provided on the downstream side of the lower portion of said tank as viewed in the direction of said relative movement, and said driving means being defined by means for pivoting said tank between the following three positions, that is, said application position, a solvent absorbing position at which said absorbing means is brought into contact with the surface of either said thermal developing photosensitive material or said image-receiving material, and said retraction position.

13. An image recording apparatus according to claim 4, wherein said tank has an opening which provides communication between the inside of said tank and the outside air, said image recording apparatus further comprising opening and closing means adapted to close said opening gradually before said applicator member is separated from the surface of either said thermal developing photosensitive material or said image-receiving material.

14. An image recording apparatus according to claim 13, wherein said opening and closing means has a resilient member which is able to come in and out of contact with said opening.

15. An image recording apparatus according to claim 14, wherein said resilient member is a leaf spring.

16. An image recording apparatus wherein an image recorded on a thermal developing photosensitive material is transferred to an image-receiving material in the presence of an image forming solvent so as to be formed on the image-receiving material, which comprises:
 (a) a tank said image forming solvent;
 (b) an applicator member having water absorption properties, one end of said applicator member being inserted into said tank so as to be immersed in said solvent, and the other end of said applicator member projecting outward from said tank, so that said applicator member retains said image forming solvent and serves as an applicator portion;
 (c) moving means for moving either said thermal developing photosensitive material or said image-receiving material; and
 (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position, and wherein said applicator member is provided on the lower portion of said tank, said driving means comprising means for pivoting said tank between said application position and said retraction position.

17. An image recording apparatus according to claim 16, wherein a plurality of said applicator members are disposed in series along the direction in which said image forming solvent is applied.

18. An image recording apparatus according to claim 16, wherein, at said application position, said applicator member is pressed against the surface of either said thermal developing photosensitive material or said image-receiving material so that the distal end portion thereof is bent, and in this state, said applicator member applies said image forming solvent to the surface of either said thermal developing photosensitive material or said image-receiving material, said image recording apparatus further comprising a resilient member disposed on the downstream side of said applicator member as viewed in the direction in which either said thermal developing photosensitive material or said image-receiving material is moved, so as to cancel said bend of said applicator member when being separated from the surface of either said thermal developing photosensitive material or image-receiving material, thereby spreading any surplus solvent gathered at the rear end of coating of said image forming solvent applied to the surface of either said thermal developing photosensitive material or said image-receiving material.

19. An image recording apparatus according to claim 18, wherein said resilient member is a spring member provided so as to extend along said applicator member.

20. An image recording apparatus according to claim 19, wherein said spring member is a leaf spring.

21. An image recording apparatus according to claim 16, further comprising limiting means disposed adjacent to said applicator member to limit the height of a solvent bead formed on the downstream side of said applicator member.

22. An image recording apparatus according to claim 21, wherein said limit means is a non-water absorbent plate member disposed on the downstream side of said applicator member as viewed in the direction in which either said thermal developing photosensitive material or said image-receiving material is moved.

23. An image recording apparatus according to claim 16, further comprising absorbing means for absorbing any surplus solvent by contacting the rear end of the coating of said image forming solvent applied to the surface of either said thermal developing photosensitive material or said image-receiving material.

24. An image recording apparatus according to claim 23, wherein said absorbing means is provided on the downstream side of the lower portion of said tank as viewed in the direction in which either said thermal developing photosensitive material or said image-receiving material is moved, and wherein said means for pivoting said tank allows movement of said tank between said application position, a solvent absorbing position at which said absorbing means is brought into contact with the surface of either said thermal developing photosensitive material or said image-receiving material, and said retraction position.

25. An image recording apparatus according to claim 16, wherein said tank has an opening which provides communication between the inside of said tank and the outside air, said image recording apparatus further comprising opening and closing means adapted to close said opening gradually before said applicator member is separated from the surface of either said thermal developing photosensitive material or said image-receiving material.

26. An image recording apparatus according to claim 25, wherein said opening and closing means has a resilient member which is able to come in and out of contact with said opening.

27. An image recording apparatus according to claim 26, wherein said resilient member is a leaf spring.

28. An image recording method wherein an image recorded on a thermal developing photosensitive material is transferred to an image-receiving material in the presence of an image forming solvent so as to be formed on the image-receiving material, which comprises the steps of:
(a) moving a water absorbent applicator member which retains said image forming solvent and either said thermal developing photosensitive material or said image-receiving material relative to each other;
(b) bringing said applicator member into contact with the surface of either said thermal developing photosensitive material or said image-receiving material; and
(c) separating said applicator member from the surface of either said thermal developing photosensitive material or said image-receiving material,
wherein the speed at which said applicator member is separated from the surface of either said thermal developing photosensitive material or said image-receiving material is higher than the speed of relative movement between said applicator member and either said thermal developing photosensitive material or said image-receiving material when said applicator member is in contact with the surface of either said thermal developing photosensitive material or said image-receiving material.

29. An image recording method wherein an image recorded on a thermal developing photosensitive material is transferred to an image-receiving material in the presence of an image forming solvent so as to be formed on the image-receiving material, which comprises the steps of:
(a) moving a water absorbent applicator member which retains said image forming solvent and either said thermal developing photosensitive material or said image-receiving material relative to each other;
(b) bringing said applicator member into contact with the surface of either said thermal developing photosensitive material or said image-receiving material; and
(c) separating said applicator member from the surface of either said thermal developing photosensitive material or said image-receiving material.
wherein the relative movement between said applicator member and either said thermal developing photosensitive material or said image-receiving material is performed in such a manner that either said thermal developing photosensitive material or said image-receiving material defines a locus with a radius of curvature R, while the separation of said applicator member is carried out in such a manner that said applicator member moves through a locus with a radius of curvature r which is smaller than R, whereby said applicator member is gradually moved away from the surface of either said thermal developing photosensitive material or said image-receiving material.

30. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank, and the other end of said applicator member projecting outward from said tank, so that said applicator member retains said image forming solvent and serves as an applicator portion;
(c) moving means for moving said applicator member and either said thermal developing photosensitive material or said image-receiving material relative to each other; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
wherein a plurality of said applicator members are disposed in series along the direction in which said image forming solvent is applied.

31. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank, and the other end of said applicator member projecting outward from said tank, so that said applicator member retains said image forming solvent and serves as an applicator portion;
(c) moving means for moving said applicator member and either said thermal developing photosensitive material or said image-receiving material relative to each other; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
wherein, at said application position, said applicator member is pressed against the surface of either said thermal developing photosensitive material or said image-receiving material so that the distal end portion thereof is bent, and in this state, said applicator member applies said image forming solvent to the surface of either said thermal developing photosensitive material or said image-receiving material, said image recording apparatus further comprising a resilient member disposed on the downstream side of said applicator member as viewed in the direction of said relative movement so as to cancel said bend of said applicator member when being separated from the surface of either said thermal developing photosensitive material or said image-receiving material, thereby spreading any surplus solvent gathered at the rear end of the coating of said image forming solvent applied to the surface of either said thermal developing photosensitive material or said image-receiving material.

32. An image recording apparatus wherein an image recorded on a thermal developing photosensitive material is transferred to an image-receiving material in the presence of an image forming solvent so as to be formed on the image-receiving material, which comprises:
   (a) a tank containing said image forming solvent;
   (b) an applicator member having water absorption properties, one end of said applicator member being inserted into said tank, and the other end of said applicator member projecting outward from said tank, so that said applicator member retains said image forming solvent and serves as an applicator portion;
   (c) moving means for moving said applicator member and either said thermal developing photosensitive material or said image-receiving material relative to each other; and
   (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
   further comprising limiting means disposed adjacent to said applicator member to limit the height of a solvent bead formed on the downstream side of said applicator member.

33. An image recording apparatus wherein an image recorded on a thermal developing photosensitive material is transferred to an image-receiving material in the presence of an image forming solvent so as to be formed on the image-receiving material, which comprises:
   (a) a tank containing said image forming solvent;
   (b) an applicator member having water absorption properties, one end of said applicator member being inserted into said tank, and the other end of said applicator member projecting outward from said tank, so that said applicator member retains said image forming solvent and serves as an applicator portion;
   (c) moving means for moving said applicator member and either said thermal developing photosensitive material or said image-receiving material relative to each other; and
   (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
   further comprising absorbing means for absorbing any surplus solvent by contacting the rear end of the coating of said image forming solvent applied to the surface of either said thermal developing photosensitive material or said image-receiving material.

34. An image recording apparatus wherein an image recorded on a thermal developing photosensitive material is transferred to an image-receiving material in the presence of an image forming solvent so as to be formed on the image-receiving material, which comprises:
   (a) a tank containing said image forming solvent;
   (b) an applicator member having water absorption properties, one end of said applicator member being inserted into said tank, and the other end of said applicator member projecting outward from said tank, so that said applicator member retains said image forming solvent and serves as an applicator portion;
   (c) moving means for moving said applicator member and either said thermal developing photosensitive material or said image-receiving material relative to each other; and
   (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position
   wherein said tank has an opening which provides communication between the inside of said tank and the outside air, said image recording apparatus further comprising opening and closing means adapted to close said opening gradually before said applicator member is separated from the surface of either said thermal developing photosensitive material or said image-receiving material.

35. An image apparatus wherein an image recorded on a thermal developing photosensitive material is transferred to an image-receiving material in the presence of an image forming solvent so as to be formed on the image-receiving material, which comprises:
   (a) a tank containing said image forming solvent;
   (b) an applicator member having water absorption properties, one end of said applicator member being inserted into said tank so as to be immersed in said solvent, and the other end of said applicator member projecting outward from said tanks, so that said applicator member retains said image forming solvent and serves as an applicator portion;
   (c) moving means for moving either said thermal developing photosensitive material or said image-receiving material; and
   (d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
wherein a plurality of said applicator members are disposed in series along the direction in which said image forming solvent is applied.

36. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank so as to be immersed in said solvent, and the other end of said applicator member projecting outward from said tank, so that said applicator member retains said image forming solvent and serves as an applicator portion;
(c) moving means for moving said thermal developing photosensitive material or said image-receiving material; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
wherein, at said application position, said applicator member is pressed against the surface of either said thermal developing photosensitive material or said image-receiving material so that the distal end portion thereof is bent, and in this state, said applicator member applies said image forming solvent to the surface of either said thermal developing photosensitive material or said image-receiving material, said image recording apparatus further comprising a resilient member disposed on the downstream side of said applicator member as viewed in the direction in which either said thermal developing photosensitive material or said image-receiving material is moved, so as to cancel said bend of said applicator member when being separated from the surface of either said thermal developing photosensitive material or said image-receiving material, thereby spreading any surplus solvent gathered at the rear end of the coating of said image forming solvent applied to the surface of either said thermal developing photosensitive material or said image-receiving material.

37. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank so as to be immersed in said solvent, and the other end of said applicator member projecting outward from said tank, so that said applicator member retains said image forming solvent and serves as an applicator portion;
(c) moving means for moving either said thermal developing photosensitive material or said image-receiving material; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
further comprising limited means disposed adjacent to said applicator member to limit the height of a solvent bead formed on the downstream side of said applicator member.

38. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank so as to be immersed in said solvent, and the other end of said applicator member projecting outward from said tank, so that said applicator member retains said image forming solvent and serves as an applicator portion;
(c) moving means for moving either said thermal developing photosensitive material or said image-receiving material; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position,
further absorbing means for absorbing any surplus solvent by contacting the rear end of the coating of said image forming solvent applied to the surface of either said thermal developing photosensitive material or said image-receiving material.

39. An image recording apparatus wherein an image recorded on a thermal developing photosensitive material is transferred to an image-receiving material in the presence of an image forming solvent so as to be formed on the image-receiving material, which comprises:
(a) a tank containing said image forming solvent;
(b) an applicator member having water absorption properties, one end of said applicator member being inserted into said tank so as to be immersed in said solvent, and the other end of said applicator member projecting outward from said tank, so that said applicator member retains said image forming solvent and serves as an applicator portion;
(c) moving means for moving either said thermal developing photosensitive material or said image-receiving material; and
(d) driving means for activating said applicator member to move between an application position at which said applicator member is brought into contact with the surface of either said thermal developing photosensitive material or said image-receiving material for the purpose of applying said image forming solvent thereto and a retraction position which is spaced apart from said application position, wherein said tank has an opening which provides communication between the inside of said tank and the outside air, said image recording apparatus further comprising opening and closing means adapted to close said opening gradually before said applicator member is separated from the surface of either said thermal developing photosensitive material or said image-receiving material.

* * * * *